(12) United States Patent
Murase et al.

(10) Patent No.: US 7,672,550 B2
(45) Date of Patent: Mar. 2, 2010

(54) ILLUMINATION LIGHT SOURCE AND IMAGE DISPLAY APPARATUS

(75) Inventors: Rena Murase, Tokyo (JP); Yoko Inoue, Tokyo (JP); Tomohiro Sasagawa, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 12/222,716

(22) Filed: Aug. 14, 2008

(65) Prior Publication Data

US 2009/0052203 A1 Feb. 26, 2009

(30) Foreign Application Priority Data

Aug. 23, 2007 (JP) .............................. 2007-217508

(51) Int. Cl.
G02B 6/42 (2006.01)
F21V 7/04 (2006.01)
G02B 5/32 (2006.01)

(52) U.S. Cl. .............................. 385/31; 385/27; 385/33; 385/34; 385/39; 385/901; 362/257; 362/259; 362/551; 362/552; 362/553; 362/559; 359/19

(58) Field of Classification Search .................. 385/27, 385/31, 33–34, 39, 901; 362/257, 259, 551–553, 362/559; 359/19
See application file for complete search history.

(56) References Cited

U.S. PATENT DOCUMENTS

| | | | |
|---|---|---|---|
| 6,249,381 B1 | 6/2001 | Suganuma | |
| 6,480,307 B1 | 11/2002 | Yang | |
| 6,611,643 B2 * | 8/2003 | Birk et al. | ............ 385/33 |
| 7,434,939 B2 | 10/2008 | Tajiri | |
| 2008/0259605 A1 | 10/2008 | Murase et al. | |
| 2008/0262316 A1 | 10/2008 | Ajima et al. | |

FOREIGN PATENT DOCUMENTS

| | | |
|---|---|---|
| JP | 11-64789 A | 3/1999 |
| JP | 11-326653 A | 11/1999 |
| JP | 11-326826 A | 11/1999 |
| JP | 11-337866 A | 12/1999 |
| JP | 2000-121836 A | 4/2000 |
| JP | 2000-268603 A | 9/2000 |
| JP | 2001-23422 A | 1/2001 |
| JP | 2001-356247 A | 12/2001 |
| JP | 2002-184206 A | 6/2002 |
| JP | 2003-131165 A | 5/2003 |
| JP | 2004-144936 A | 5/2004 |

(Continued)

*Primary Examiner*—Frank G Font
*Assistant Examiner*—Michael P Mooney
(74) *Attorney, Agent, or Firm*—Birch, Stewart, Kolasch & Birch, LLP

(57) ABSTRACT

A coherent light source includes a plurality of light emitting points arranged in one-dimensional array. A beam shaping unit shapes a light beam so that a diameter of a light emitted from the coherent light source in a direction perpendicular to a direction of the light emitting point array is larger than a diameter in the direction of the light emitting point array, and an intensity distribution of the light emitted from each of the light emitting points is uniform. A magnification of a focusing optical system is set such that a light emitted from the beam shaping unit is coupled to an optical fiber based on a maximum diameter of the light emitted from the beam shaping unit.

12 Claims, 5 Drawing Sheets

FOREIGN PATENT DOCUMENTS

| | | |
|---|---|---|
| JP | 2004-146793 A | 5/2004 |
| JP | 2005-331906 A | 12/2005 |
| JP | 2008-242371 A | 10/2008 |
| WO | WO-2006/011571 A1 | 2/2006 |

\* cited by examiner

ILLUMINATION LIGHT SOURCE AND IMAGE DISPLAY APPARATUS

BACKGROUND OF THE INVENTION

1. Field of the Invention

The present invention relates to an illumination light source that employs a coherent light source, and an image display apparatus that employs this illumination light source.

2. Description of the Related Art

In recent years, a laser is used as a light source of optical image display apparatuses in many cases. Generally, a light emitted from a laser has high directivity, and therefore, it is expected that the light use efficiency be improved. In addition, a monochromatic property of the laser light realizes a wide color reproduction range that is required in the image display apparatuses. Therefore, lasers are considered useful as an illumination light source. On the other hand, because the laser light has high coherence, if a laser is used as a light source of an image display apparatus, there is a problem that dot patterns called a speckle noise due to interference of the light is caused. This is caused because minute irregularity in devices in an illumination optical system, light bulbs, in devices in a projection optical system, or on a screen causes the phases of the light beams that have passed through different points on a device surface to shift by an amount corresponding to the irregularity, and those light beams that are coherent with each other form an interference pattern on an image surface. Because surface precision of the devices is limited, when a light source having high coherence is used, influence of the speckle noise is always a problem. With the recent advance in a laser technology, development of a semiconductor laser that is compact and high-power, and that outputs high quality beams, and the like is active, and it is expected that a laser is increasingly used as a light source of image display apparatuses in future. Therefore, establishment of a speckle noise suppression method is demanded.

The problem of the speckles in image display apparatuses in which a laser is used as a light source can be solved by reducing only coherence of a laser beam while maintaining the property of the laser beam, such as the monochromaticity and the high directivity. The coherence of the laser beam can be reduced by largely disarranging its equi-phase plane. As a method of reducing the coherence of the laser beam, a method in which a coherent light beam generated by a single laser (resonator) is divided into a plurality of light beams that are incoherent with each other and the light beams are synthesized, or a method in which a plurality of coherent light beams that are incoherent with each other generated by different lasers (resonators) are synthesized has been used.

As a technique based on the former method, a technique in which a plurality of juxtaposed element lenses (microlens array) are used (see, e.g., Japanese Patent Application Laid-open No. 2000-268603) and a technique in which a fiber bundle composed of a plurality of optical fibers having different lengths is used (see, e.g., Japanese Patent Application Laid-open No. H11-326653) have been proposed. In these techniques, light emitted from a laser is divided into a plurality of light beams using those devices to make a difference in an optical distance between the light beams larger than the coherence length of the light. Thus, the light beams become incoherent with each other, thereby reducing the coherence of the light source as a whole.

As a technique based on the latter method, an exposure semiconductor laser light source that includes a plurality of semiconductor lasers having different wavelengths and an optical fiber corresponding to each of the semiconductor lasers, and that emits a low coherent light from the optical fibers has been proposed (see, e.g., Japanese Patent Application Laid-open No. 2004-146793). In this technique, because the light beams emitted from the semiconductor lasers have low coherence, the coherence of a light obtained by synthesizing the light beams becomes low as a whole.

According to the above techniques, a low coherent light can be generated that is constituted by a plurality of light beams incoherent with each other. Furthermore, the coherence of such a synthesized light beam can be sufficiently reduced by increasing the number of devices. However, because light loss is large in light division using a microlens array or a fiber bundle as in the former method, high light use efficiency cannot be achieved. On the other hand, when a plurality of semiconductor lasers having different wavelengths are used as a light source as in the latter technique, wavelength intervals are required to be large to sufficiently reduce the coherence. Therefore, a wavelength range in the light source is to be wide, resulting in degradation of the monochromaticity. In addition, in the above techniques, to further reduce the coherence, a large number of fibers, light division devices, and semiconductor lasers are required. While the increase of the devices can enhance the image quality such as color and brightness, it is not suitable for image display apparatuses for which compact size of an illumination device and cost reduction are demanded.

As described above, the conventional speckle reducing methods still have problems to be solved in terms of light use efficiency, cost, and compact size of the apparatuses.

SUMMARY OF THE INVENTION

It is an object of the present invention to at least partially solve the problems in the conventional technology.

According to an aspect of the present invention, there is provided an illumination light source including a coherent light source in which a plurality of light emitting points are arranged in one-dimensional array; a beam shaping unit that shapes a light beam so that a diameter of a light emitted from the coherent light source in a direction perpendicular to a direction of the light emitting point array is larger than a diameter in the direction of the light emitting point array, and an intensity distribution of the light emitted from each of the light emitting points is uniform; an optical fiber; and a focusing optical system in which a magnification is set such that a light emitted from the beam shaping unit is coupled to the optical fiber based on a maximum diameter of the light emitted from the beam shaping unit.

Furthermore, according to another aspect of the present invention, there is provided an image display apparatus including an illumination optical system that includes an illumination light source and outputs illumination light; a light modulating device that controls the illumination light input from the illumination optical system and forms an image; and a display unit that displays light from the light modulating device. The illumination light source includes a coherent light source in which a plurality of light emitting points are arranged in one-dimensional array, a beam shaping unit that shapes a light beam so that a diameter of a light emitted from the coherent light source in a direction perpendicular to a direction of the light emitting point array is larger than a diameter in the direction of the light emitting point array, and an intensity distribution of the light emitted from each of the light emitting points is uniform, an optical fiber, and a focusing optical system in which a magnification is set such that a light emitted from the beam shaping unit is coupled to the optical fiber based on a maximum diameter of the light emitted from the beam shaping unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an illumination light source and an image display apparatus according to the present invention will be explained below in detail with reference to the accompanying drawings. Note that the invention is not limited to the embodiments.

Figure 1:
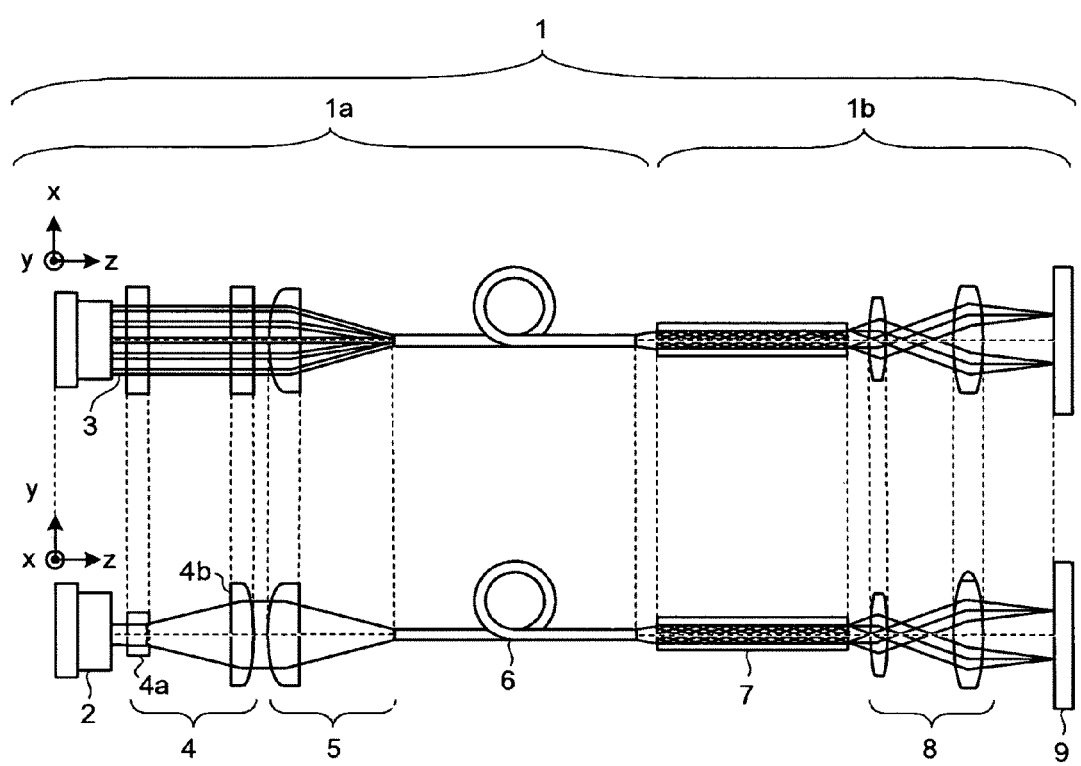
FIG. 1 is a configuration diagram of an illumination device that employs an illumination light source according to an embodiment of the present invention.

FIG. 1 is a configuration diagram of the illumination device that employs an illumination light source according to an embodiment of the present invention. An illumination device 1 according to the embodiment includes an illumination light source 1a and an illumination optical system 1b. Hereinafter, a light emitting point arranging direction shown in FIG. 1 is referred to as an x-axis, an optical axis direction is referred to as a z-axis, and a direction perpendicular to the x-axis and the z-axis is referred to as a y-axis. Further, based on the x-, y-, and z-axes, a plane defined by an axis of the light emitting point arranging direction and the optical axis is referred to as an xz-plane, and a plane defined by an axis perpendicular to the light emitting point arranging direction and the optical axis is referred to as a yz-plane.

The illumination light source 1a includes a surface emitting laser 2 that has a plurality of light emitting points as a coherent light source, a beam-shaping optical system 4 that shapes a plurality of coherent light beams 3 that are emitted from the surface emitting laser 2 into a desirable beam shape, a focusing optical system 5 to converge the coherent light beams 3 that has passed the beam-shaping optical system 4, and an optical fiber 6.

The illumination optical system 1b includes an integrator rod 7 that makes a spatial intensity distribution of light that is emitted from the optical fiber 6 uniform, an illumination optical system 8 that is constituted of a lens and a mirror, and a light bulb 9 such as a liquid crystal panel and a digital micromirror device (DMD) serving as a modulation device that provides an image signal by spatially modulating illuminated light. By further including a projection optical system (not shown) that projects on a screen in an enlarged manner to project light emitted from the light bulb 9 in an enlarged manner, and a display unit (not shown) such as a screen on which light from the projection optical system is projected, an image display apparatus such as an image projection apparatus can be configured.

Figure 2A:
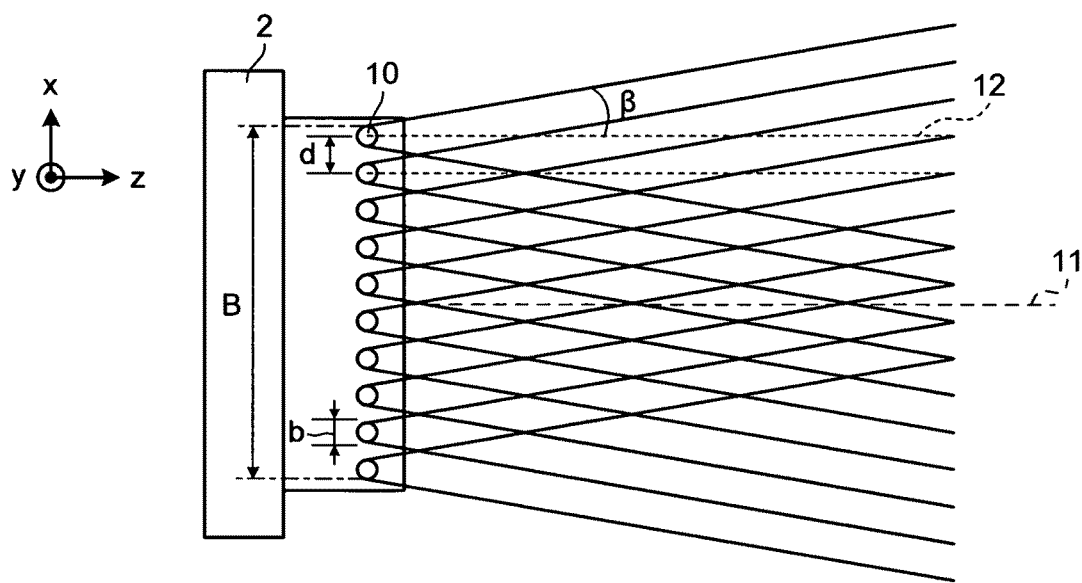
FIGS. 2A and 2B are conceptual diagrams of a laser that has a structure in which a plurality of light emitting points are arranged in a one-dimensional array in a light source.
Figure 2B:
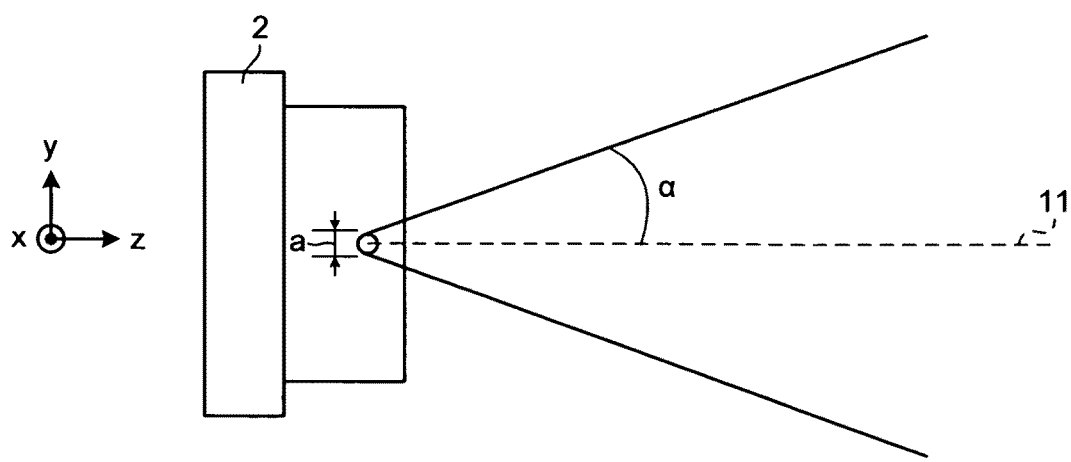

FIGS. 2A and 2B are conceptual diagrams of a laser that has a structure in which a plurality of light emitting points are arranged in a one-dimensional array in a light source. FIG. 2A depicts the light source viewed from a direction of the y-axis, and FIG. 2B depicts the light source viewed from the direction of x-axis. In the surface emitting laser 2, a plurality of light emitting points 10 are arranged at regular intervals in the x-direction, and a coherent light beam whose divergence angle $\alpha$ on the yz-plane and divergence angle $\beta$ on the xz-plane are both extremely close to 0 degrees is emitted from each of the light emitting points 10. The surface emitting laser 2 according to the first embodiment has 10 pieces of the light emitting points 10, the light emitting points 10 are linearly arranged at intervals of 150 micrometers, and half angles at half maximum of the divergence angles on the yz-plane and the xz-plane of the laser beam emitted from the light emitting points 10 are both approximately 0.2 degree.

Figure 3:
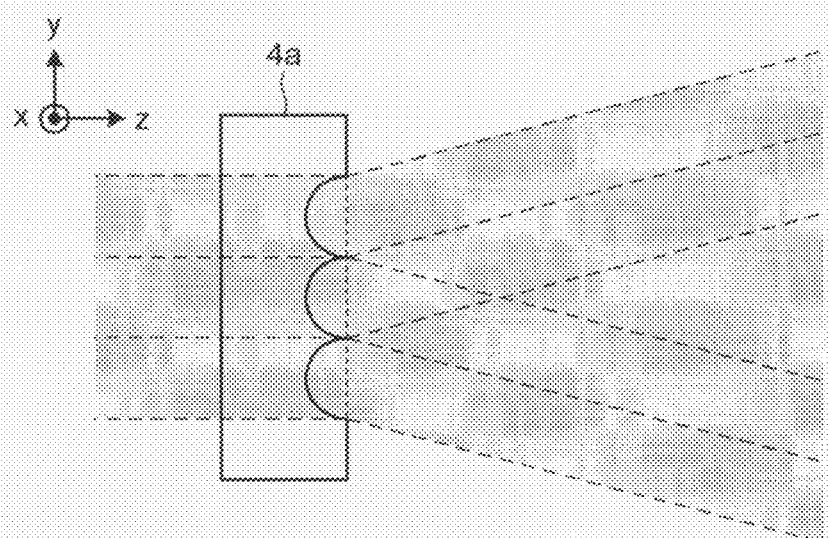
FIG. 3 is a configuration example of a multi-lens that is arranged in a beam-shaping optical system.

FIG. 3 is a configuration example of a multi-lens that is arranged in the beam-shaping optical system. As shown in FIG. 3, in the present embodiment, a multi-lens 4a in which three plano-concave cylindrical lenses serving as the beam-shaping optical system 4 are aligned to have a curvature in the direction of the y-axis, and a plano-convex cylindrical lens 4b are combined so that a magnification effect is obtained only on the yz-plane of a laser beam. As the beam-shaping optical system 4, another structure can be applied as long as a similar effect is obtained.

Because the coherent light beams emitted from the light emitting points 10 in the surface emitting laser 2 have an equal oscillation wavelength, a monochromatic property is excellent as light of the surface emitting laser as a whole. However, on the other hand, a light beam emitted from each of the light emitting points 10 has considerably high coherence, and a problem of speckle is concerned for application to an image display apparatus. In the illumination light source 1a according to the present embodiment, by employing the surface emitting laser 2, which is a one-dimensional array light source, the beam-shaping optical system 4, the focusing optical system 5, and the optical fiber 6, coherence of a light beam emitted from each of the light emitting points 10 is lowered. Furthermore, by spatially overlapping a plurality of light beams that are incoherent with each other emitted from the light emitting points 10 in the one-dimensional array light source to average speckle patterns, a speckle noise can be easily and effectively suppressed.

A principle of speckle noise reduction by spatially overlapping a plurality of incoherent light beams that are emitted from the light emitting points 10 is described below. When at a spatial position r on the irradiation surface to which light is irradiated, two light beams that have relation of a phase difference $\Delta\phi a(r)$ expressed by a function of the position r as indicated by Equations (1) and (2) are coherent with each other, light intensity $I_{co}(r)$ of light that is synthesized from the two light beams on the irradiation surface is expressed as Equation (3) as an equation of a spatial coordinate on the irradiation surface.

$$A(r,t) = u \cdot \exp(i\phi a(r,t)) \quad (1)$$

$$A'(r,t) = u \cdot \exp[i(\phi a(r,t) + \Delta\phi a(r))] \quad (2)$$

$$I_{co}(r) \propto |A + A'|^2 = 2u^2 + 2u^2 \cos \Delta\phi a(r) \quad (3)$$

On the other hand, when the two light beams are incoherent, light intensity $I_{inco}$ of the light synthesized therefrom is expressed as Equation (4).

$$I_{inco}(r) \propto |A|^2 + |A'|^2 = 2u^2 \quad (4)$$

Figure 4:
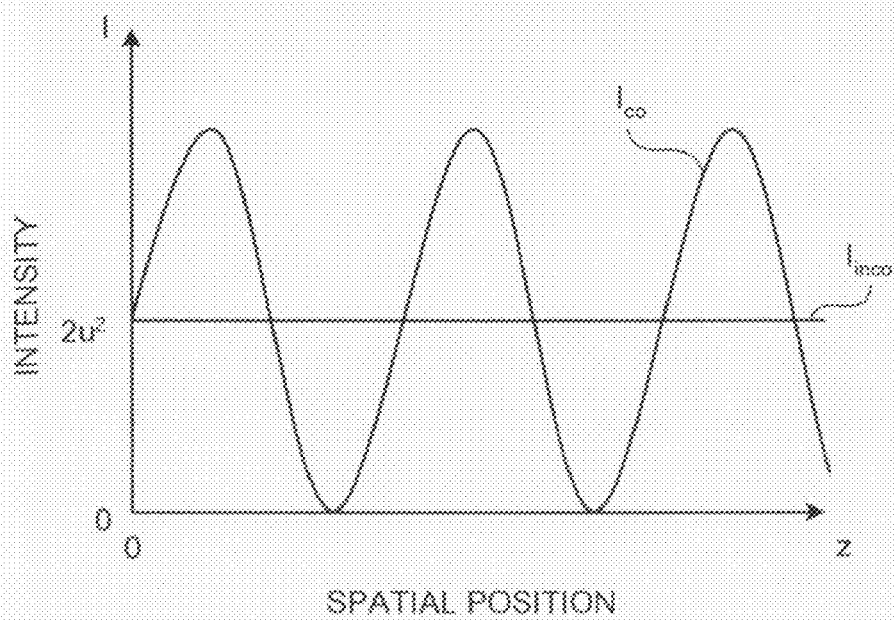
FIG. 4 is a chart of a light intensity distribution with respect to a spatial position when two light beams are overlapped.

FIG. 4 is a chart of a light intensity distribution with respect to a spatial position when two light beams are overlapped. As is evident from FIG. 4, the light intensity $I_{inco}$ when two light beams that are incoherent are overlapped is constant, independent of a spatial position, in other words, independent of an amount of a phase shift that is generated by the irregularity of a device. On the other hand, the light intensity $I_{co}$ when two light beams that are coherent with each other are overlapped varies in different spatial positions due to a difference in an amount of a phase shift. Light and dark fringes that are caused due to coherence of a light source as the latter are called speckles.

Figure 5:
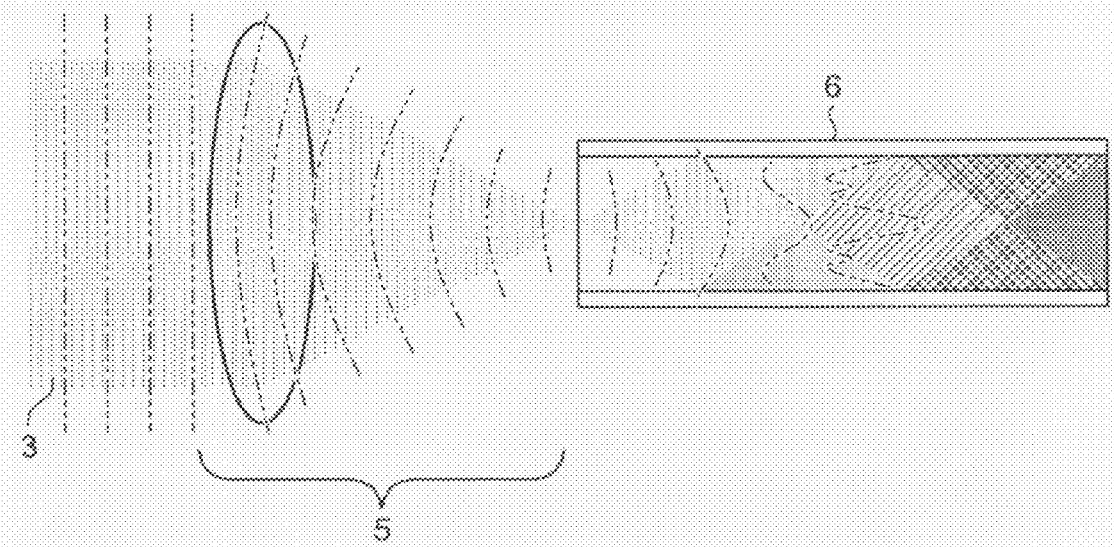
FIG. 5 is a schematic diagram of disarrangement of an equi-phase plane caused by propagation of coherent light in an optical fiber.

Accordingly, the speckles can be suppressed by reducing the coherence of light. Moreover, the coherence of light can be reduced by disarranging the equi-phase plane thereof. Therefore, the illumination light source 1a is configured to have an effect of disarranging the equi-phase plane of light by arranging the focusing optical system 5 and the optical fiber 6. FIG. 5 is a schematic diagram of disarrangement of the equi-phase plane caused by propagation of coherent light in the optical fiber. As shown in FIG. 5, when the coherent light is coupled to the optical fiber 6, the light converging lens (the focusing optical system 5) makes an optical propagation distance vary among beams in the coherent light. As a result, the equi-phase plane is distorted. An amount of the distortion increases as the propagation distance increases. The distortion of the equi-phase plane is folded by multiple reflections in the optical fiber 6, and the equi-phase plane of the light becomes randomly distributed. Thus, the coherence of the light is reduced. Because the optical fiber 6 has an effect of confining light in a core of such a small diameter of several hundred micrometers to several millimeters by total reflection, application of the optical fiber 6 is remarkably effective for reduction of coherence by the internal multiple reflections.

Figure 6:
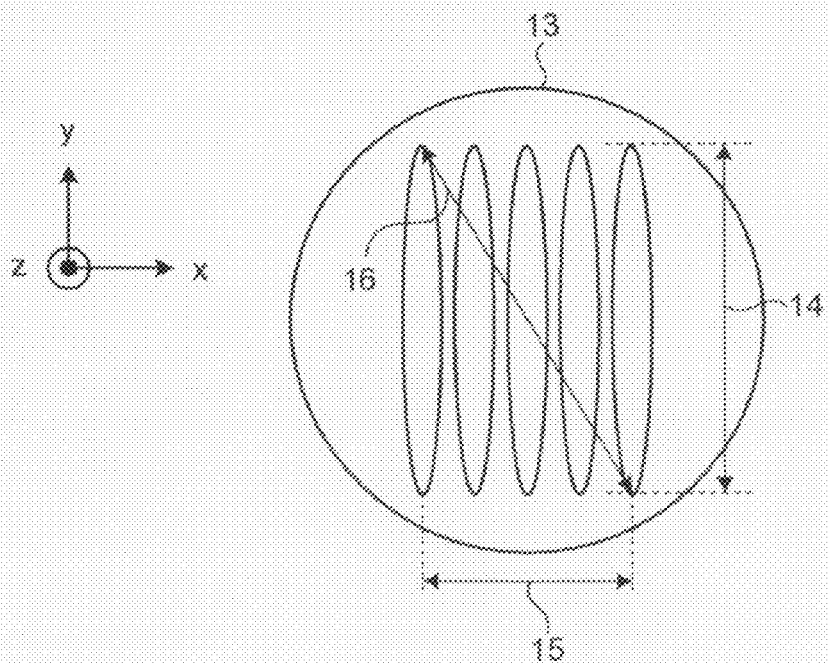
FIG. 6 is a chart of a spatial intensity distribution of light on an incident surface of a focusing optical system.

In addition, the illumination light source 1a is configured to most effectively obtain the coherence reduction effect using the focusing optical system 5 and the optical fiber 6, by arranging the beam-shaping optical system 4 between the light source (the surface emitting laser 2) and the focusing optical system 5. FIG. 6 is a chart of a spatial intensity distribution of light on an incident surface of the focusing optical system. As shown in FIG. 6, the beam-shaping optical system 4 acts on the entire light only on the yz-direction so that on an incident surface 13 of the focusing optical system 5, a diameter 14 on the yz-plane of a light beam from each light emitting point that is emitted from the surface emitting laser 2, which is the one-dimensional array light source, is larger than a diameter 15 of the entire light on the xz-plane, and the intensity distribution of the light in the beam is equalized. By the focusing optical system 5 that is optimally designed based on the optical system and a maximum diameter 16 of the entire light that has passed the optical system, a phase difference that eliminates coherence between more beams in the coherent light is given. Furthermore, because a plurality of coherent light beams enter the optical fiber at maximum incident angles, respectively, the number of reflection inside the optical fiber 6 can be further increased, thereby obtaining excellent coherence reduction effect in which the equi-phase surface is greatly distorted.

In the optical system in the illumination light source 1a having such a configuration, further reduction of the speckle is possible. The coherent light beams emitted from the light emitting points 10 in the surface emitting laser 2, which is the one-dimensional array light source, are generated by different resonators. Therefore, the coherent light beams 3 do not have uniform phases and are incoherent with each other. When such light beams that are incoherent with each other are spatially overlapped, the light intensity thereof is simply multiplied as shown in Equation (4), and the spatial light intensity distribution is averaged. As evidenced by statistics, a standard deviation of average of a random distribution is inversely proportional to the square root of the number of samples. Therefore, the speckle contrast when coherent light beams that are emitted from n-units of light emitting points and that are incoherent with each other are overlapped with each other is $1/(n)^{1/2}$ of the speckle contrast that is caused by a coherent light beam emitted from a single light emitting point, and as the number of coherent light beams to be overlapped with each other increases, the speckle contrast exponentially decreases.

Moreover, in the illumination light source 1a, a plurality of light beams that are emitted from the surface emitting laser 2, which is the one-dimensional array light source, and that are incoherent with each other are coupled to the single optical fiber by the focusing optical system 5 to be propagated, thereby diverging each of the light beams to be as large as a diameter of the core such that a spatial intensity distribution is rotationally symmetric to a center axis of the optical fiber 6. As a result, a synthesized light in which the light beams incoherent with each other are completely spatially overlapped can be obtained at an emitting end of the optical fiber 6.

Furthermore, in the illumination light source 1a, the state of the synthesized light in which the coherence is reduced is maintained also on the arbitrary xy-plane of the illumination optical system 1b in a subsequent stage. To maintain the light beams spatially overlapped at the emitting end of the optical fiber 6 also in the illumination optical system 1b in the subsequent stage, it is required that the divergence angle (θ1, θ2, ..., θn) with respect to an optical axis 12 of each of the light beams emitted from each of the emitting spots and a propagation angle (δ1, δ2, ..., δn) that is formed by an optical axis 11 of the entire light and an axis in the propagation direction of each of the light beams emitted from each of the light emitting points are required to satisfy θ1=θ2=θ3= ... =θn and δ1=δ2=δ3= ... =δn, respectively, at the emitting end of the optical fiber 6, which is an emitting end of the illumination light source 1a.

Generally, the simplest optical system to couple a plurality of light beams that are emitted from a one-dimensional array light source and that are aligned in a one-dimensional direction to an optical fiber is such a system that a plurality of light beams emitted from a light source are handled as a single beam and are coupled to an optical fiber by a focusing optical system that is optimal to a diameter of the beam. With this configuration, because the focusing optical system is optimized for a beam diameter of the entire light in the direction of arrangement of the light emitting points, the convergence angle of each of light beams emitted from respective light emitting points is considerably small, and the light beams pass different spatial positions on the incident surface of the focusing optical system. Therefore, each of the light beams enters the optical fiber at different propagation angles and different divergence angles from each other. When the convergence angle of each light beam is small, the coherence reduction effect obtained by the distortion of the equi-phase plane and the multiple reflections in the optical fiber is small. In addition, as the optical propagation distance increases due to differences in the propagation angle and the divergence angle between light beams, overlap in each light beam is to be small. As a result, the speckle noise reduction effect is deteriorated.

However, in the illumination light source 1a, the diameter on the yz-plane is magnified to be larger than the diameter on the xz-plane by the beam-shaping optical system 4, and light is coupled to the optical fiber 6 by the focusing optical system 5 that is designed based on the maximum diameter 16 of the entire light that has passed the beam-shaping optical system 4. With such a configuration, the maximum incident angles of the respective light beams to the optical fiber 6 relative to the optical axis 12 thereof are all dependent on the diameter 14 of the light beams on the yz-plane, and light beams with the diameter 14 equal to each other are coupled to the optical fiber 6 at equal maximum incident angles. Therefore, the coherent light beams emitted from the optical fiber have approximately the same divergence angle. Moreover, because the diameter 15 of the entire light on the xz-plane is smaller than the maximum diameter 16 of the entire light, a difference in the incident angle with respect to the center axis of the optical fiber 6 between the light beams is small, and any light beam emitted from the optical fiber 6 has approximately the same propagation angle. Accordingly, light beams that are emitted from the optical fiber 6, which is the emitting end of the illumination light source 1a, are spatially overlapped, and the overlapped state of the light beams is maintained on an arbitrary xy-plane in the illumination optical system 1b in the subsequent stage.

As described above, even if a light beam emitted from each of the light emitting points 10 is highly coherent, by employing such an optical system that the beam diameter of each light beam in the direction of the yz-plane is magnified and the light intensity distribution in each light beam is equalized by the beam-shaping optical system 4, and that each light beam is coupled to the optical fiber 6 by the focusing optical system 5 that is optimally designed for the diameter of light of the entire light source, the equi-phase plane of each light beam is disarranged to reduce the coherence of the light. In addition, because light beams emitted from the emitting end of the illumination light source 1a are light beams incoherent with each other and have a uniform divergence angle and propagation angle, speckle patterns at the emitting end of the illumination light source 1a or on an arbitrary xy-plane in a subsequent stage are averaged. Therefore, in an image display apparatus that employs the illumination light source 1a, by configuring such that an image on the emitting end of the illumination light source 1a or on an arbitrary xy-plane in the subsequent stage is transferred to an image display unit, a speckle noise in the image display unit is suppressed. In other words, in an image display apparatus that employs the illumination light source 1a, an excellent speckle reduction effect can be obtained.

Figure 7:
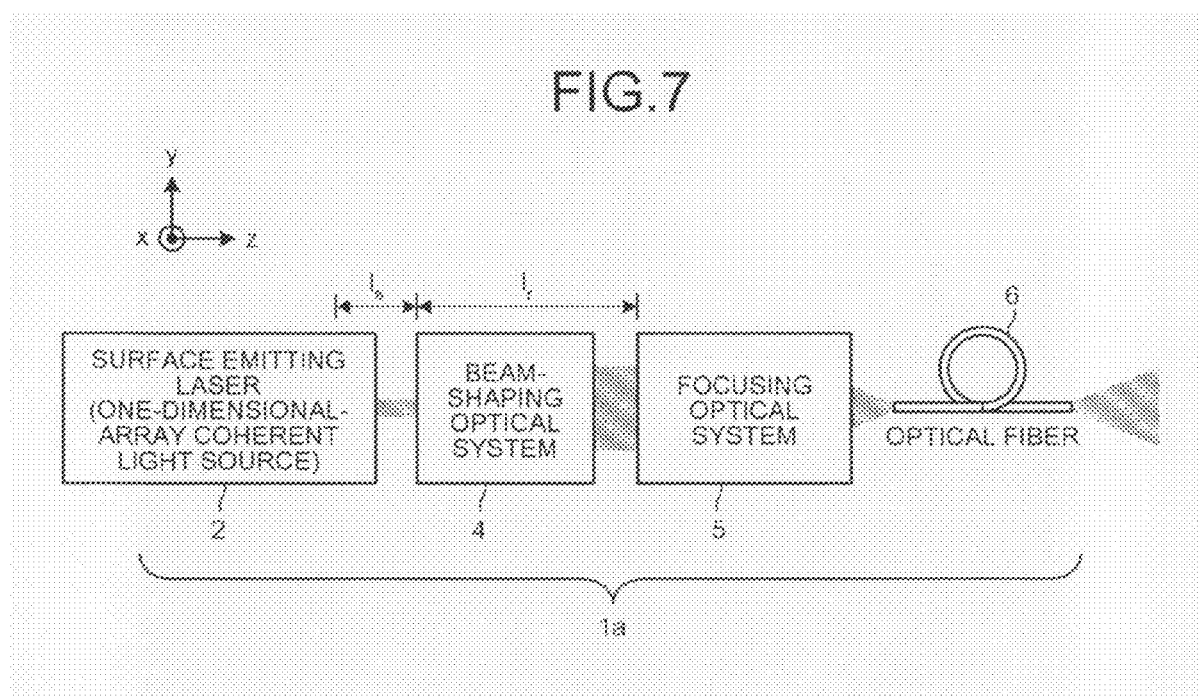
FIG. 7 is a schematic diagram of an illumination light source according to the present invention.

Conditions required for the present embodiment are specifically described referring to FIGS. 2 and 7 below. FIG. 7 is a schematic diagram of the illumination light source according to the present invention. As shown in the conceptual diagram of the one-dimensional array light source in FIG. 2 and the conceptual diagram of the illumination light source in FIG. 7, the number of the light emitting points 10 in the coherent light source in which multiple light emitting points 10 that emit coherent light beams are arranged in a one-dimensional array is n (n is an arbitrary number equal to or larger than 2), a distance between the adjacent light emitting points is d, diameters of the coherent light beam emitted from each of the light emitting points 10 on the yz-plane and on the xz-plane are a and b, respectively, the half angles at half maximums of the divergence angles on the yz-plane and the xz-plane are α and β, respectively, a spatial propagation distance from a light emitting surface of the surface emitting laser 2 to the incident end of the beam-shaping optical system 4 is $l_s$, a distance from the incident end of the beam-shaping optical system 4 to the focusing optical system 5 is $l_r$, a magnification of the beam-shaping optical system 4 that acts only on the yz-plane of light is L, a reduction rate of the light in the focusing optical system 5 is T, and a fiber diameter is c.

(a) The magnification L of the beam-shaping optical system 4 on the yz-plane satisfies at least the following relation $$L \geq \frac{b + (n-1) \cdot d + 2(l_s + l_r)\tan\beta}{a + 2l_s \tan\alpha}$$

(b) The light-intensity-distribution equalization effect of the beam-shaping optical system 4 at least works such that full width at half maximum of the intensity distribution of a light beam emitted from each of the light emitting points after passing through the beam-shaping optical system 4 is larger than full width at half maximum of the intensity distribution at the emitting end of the light emitting points.

(c) The reduction rate T in the focusing optical system 5 satisfies the following relation $$T \leq \frac{c}{\sqrt{\{(a + 2l_s \tan\alpha)L\}^2 + \{b + (n-1)\cdot d + 2(l_s + l_r)\tan\beta\}^2}}$$

(d) The optical fiber 6 has such length that each of the coherent light beams is reflected at least once therein.

In the illumination light source 1a, when the conditions (a), (b), (c), and (d) are satisfied, by disarranging the equi-phase plane of a coherent light beam that is emitted from each of the light emitting points 10, the coherence thereof is reduced. Further, by overlapping light beams that are incoherent with each other emitted from the light emitting points 10, a speckle noise is averaged. As a result, the speckle noise can be suppressed.

Moreover, the conditions (a), (b), and (d) are minimum requirements for the speckle noise reduction effect to be obtained in the illumination light source 1a, and the larger the magnification L is, the larger the full width at half maximum of the intensity distribution of the light beams emitted from each of the light emitting points 10 after passing the beam-shaping optical system 4 is than the full width at half maximum of the intensity distribution at the emitting end of the light emitting points, and the longer the length of the optical fiber 6 is, the larger speckle reduction effect can be obtained.

Furthermore, as described above, to keep the coherence of light emitted from the illumination light source 1a low also in a subsequent optical system, it is preferable that the magnification L is as large as possible in the condition (a). As described above, when n light beams that are incoherent with each other are overlapped, the speckle contrast is suppressed to $1/(n)^{1/2}$. For example, when n=4, the speckle contrast can be reduced to half compared with the case in which n=1. Therefore, specifically, it is preferable to arrange the beam-shaping optical system 4 that has such magnification L that light beams emitted from four or more emitting spots are overlapped in the image display unit.

The illumination light source 1a according to the present embodiment that is constituted of the beam-shaping optical system 4, the focusing optical system 5, and the optical fiber 6 that satisfy the above conditions (a), (b), (c), and (d) can output light having low coherence and an excellent speckle reduction effect, while maintaining the monochromatic property and the high directivity of laser, and is realized with a simple configuration. For example, by incorporating the illumination light source 1a in an illumination device of an image display apparatus, an image display apparatus that is compact and in which the speckle noise is suppressed to have high image quality can be provided.

While in the present embodiment, a surface emitting laser is used as an example of a coherent light source that has a plurality of light emitting points arranged in one-dimensional array, the present invention is not limited thereto, and, for example, a solid-state laser from which beams are emitted in an array, a semiconductor laser that has a plurality of light emitting points, or the like can be used.

Moreover, while in the present embodiment, the multi-lens 4a in which three plano-concave cylindrical lenses are aligned to have a curvature in the direction of the y-axis, and the plano-convex cylindrical lens 4b are combined in the beam-shaping optical system 4, the present invention is not limited thereto. Instead of the multi-lens 4a, for example, a multi-lens in which three plano-convex cylindrical lenses, or more plano-convex cylindrical lenses are aligned to have a curvature in the direction of the y-axis, a multi-lens in which multiple plano-concave cylindrical lenses are aligned to have a curvature in the direction of y-axis, a gradient-index microlens, or a holographic device can be used. Alternatively, a configuration in which, for example, a spherical lens that is designed with respect to a divergence angle of the entire light in the direction of both the xz- and the yz-planes is used instead of the plano-convex cylindrical lens 4b or a configuration in which such a device is not used at all by using the focusing optical system 5 that is capable of absorbing the divergence angle of light caused by the multi-lens described above can be applied.

Furthermore, while in the present embodiment, the integrator rod 7 is used as a device that makes a spatial intensity distribution of the illumination optical system 1b uniform, the present invention is not limited thereto, and other devices that make the spatial intensity distribution uniform, such as a microlens, can be used. However, because some reduction of coherence can be expected by using a device having such an effect of making the spatial intensity distribution of light uniform as the integrator rod 7, it is preferable that such a device is used in combination with the illumination light source 1a of the embodiment.

According to the present embodiment, each of a plurality of coherent light beams that are emitted from a plurality of light emitting points arranged in a one-dimensional array are magnified in a direction perpendicular to the direction of arrangement of the light emitting points, by the effect of the beam-shaping optical system 4, and the intensity distribution in the beam becomes uniform at the same time. By combining the focusing optical system 5 and the optical fiber 6, a phase difference that eliminates coherence between beams in the coherent light can be given, and the multiple reflections in the optical fiber 6 can be caused frequently. With these effects, the equi-phase plane of coherent light is remarkably disarranged, and as a result, an excellent coherent reduction effect is obtained.

Moreover, each light beam that is emitted from each of the light emitting points 10 and that enters the optical fiber 6 diverges to have a spatial intensity distribution that is rotationally symmetric to a center axis of the optical fiber 6 while propagating inside the optical fiber 6, thereby increasing overlap with other coherent light beams at the emitting end of the optical fiber 6. Furthermore, because each of the coherent light beams with an equal maximum incident angle is coupled to the optical fiber, the divergence angles thereof become equal to each other, and because the diameter in the direction of arrangement of the light emitting points is sufficiently small compared to the maximum diameter 16 of the entire light, the propagation angles of the coherent light beams become equal to each other. Thus, at the emitting end of the optical fiber 6, the coherent light beams spatially overlap with each other, and have an equal divergence angle and propagation angle in any-direction. Therefore, it is possible to make the optical axes 12 of the coherent light beams coincide with each other at the emitting end of the optical fiber 6. Accordingly, because the light beams that are incoherent with each other emitted from the multiple separate light emitting points 10 overlap with each other, the speckle contrast is suppressed in light beams emitted from the illumination light source 1a, and this effect is maintained also in a subsequent optical system.

If the present invention is applied to an illumination light source in which a laser is used as a coherent light source, the coherence of the light source can be lowered with a simple configuration, and for example, by incorporating the illumination light source in an image display apparatus, the speckle noise is reduced and a high quality image is obtained.

As described above, according to an aspect of the present invention, a phase difference that eliminates coherence between beams in the coherent light is given, and an equi-phase plane of the coherent light is greatly disarranged, thereby obtaining an excellent coherence reduction effect. Furthermore, light beams that are incoherent with each other emitted from a plurality of separate light emitting points can be overlapped, thereby suppressing a speckle contrast, and obtaining such an effect that a state of a synthesized light in which coherence is reduced is maintained in an optical system in a subsequent stage.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An illumination light source comprising:
a coherent light source in which a plurality of light emitting points are arranged in one-dimensional array;
a beam shaping unit that shapes a light beam so that a diameter of a light emitted from the coherent light source in a direction perpendicular to a direction of the light emitting point array is larger than a diameter in the direction of the light emitting point array, and an intensity distribution of the light emitted from each of the light emitting points is uniform;
an optical fiber; and
a focusing optical system in which a magnification is set such that a light emitted from the beam shaping unit is coupled to the optical fiber based on a maximum diameter of the light emitted from the beam shaping unit.

2. The illumination light source according to claim 1, wherein
the magnification of the beam shaping unit on yz-plane at least satisfies $$L \geq \frac{b + (n-1) \cdot d + 2(l_s + l_r)\tan\beta}{a + 2l_s\tan\alpha}$$

where L is magnification of the beam shaping unit, x is direction of the light emitting point array, z is direction of an optical axis of the coherent light beam, y is direction perpendicular to the direction of the light emitting point array and to the direction of the optical axis, n is number of the light emitting points of the coherent light source, which is an integer equal to or larger than two, d is distance between the light emitting points, a is diameter of the coherent light beam emitted from the light emitting point on the yz-plane, b is diameter of the coherent light emitted from the light emitting point on xz-plane, α is half angle at half maximum of a divergence angle of the light emitting point on the yz-plane, β is half angle at half maximum of the divergence angle of the light emitting point on the xz-plane, $l_s$ is spatial propagation distance of light from a light emitting surface of the coherent light source to an incident end of the beam shaping unit, and $l_r$ is distance from the incident end of the beam shaping unit to the focusing optical system, light-intensity-distribution equalization effect of the beam shaping unit at least works such that full width at half maximum of an intensity distribution of a light beam emitted from each of the light emitting points after passing through the beam shaping unit is larger than full width at half maximum of an intensity distribution at the emitting ends of the light emitting points, reduction rate of the light in the focusing optical system satisfies $$T \leq \frac{c}{\sqrt{\{(a+2l_s\tan\alpha)L\}^2 + \{b+(n-1)\cdot d + 2(l_s+l_r)\tan\beta\}^2}}$$

where T is the reduction rate and c is fiber diameter of the optical fiber, and the optical fiber has such a length that each of the coherent light beams is reflected at least once therein.

3. The illumination light source according to claim 1, wherein the beam shaping unit employs any one of a multi-lens acting in the yz-direction, a gradient-index microlens, and a holographic device.

4. The illumination light source according to claim 1, wherein the beam shaping unit employs either one of a multi-lens in which a plurality of plano-convex cylindrical lenses are aligned to have a curvature in a y-direction and a multi-lens in which a plurality of plano-concave cylindrical lenses are aligned to have a curvature in the y-direction.

5. The illumination light source according to claim 1, wherein the beam shaping unit is either one of a combination of a multi-lens in which a plurality of plano-convex cylindrical lenses are aligned to have a curvature in a y-direction and a plano-concave cylindrical lens and a combination of a multi-lens in which a plurality of plano-concave cylindrical lenses are aligned to have a curvature in the y-direction and a plano-concave cylindrical lens.

6. The illumination light source according to claim 1, wherein the coherent light source includes a semiconductor laser or a surface emitting laser having a plurality of light emitting points that emit coherent light beams arranged in one-dimensional array and a solid state laser array.

7. An image display apparatus comprising:
an illumination optical system that includes an illumination light source and outputs illumination light;
a light modulating device that controls the illumination light input from the illumination optical system and forms an image; and
a display unit that displays light from the light modulating device, wherein
the illumination light source includes
a coherent light source in which a plurality of light emitting points are arranged in one-dimensional array, a beam shaping unit that shapes a light beam so that a diameter of a light emitted from the coherent light source in a direction perpendicular to a direction of the light emitting point array is larger than a diameter in the direction of the light emitting point array, and an intensity distribution of the light emitted from each of the light emitting points is uniform, an optical fiber, and a focusing optical system in which a magnification is set such that a light emitted from the beam shaping unit is coupled to the optical fiber based on a maximum diameter of the light emitted from the beam shaping unit.

8. The image display apparatus according to claim 7, wherein the magnification of the beam shaping unit on yz-plane at least satisfies $$L \geq \frac{b+(n-1)\cdot d + 2(l_s+l_r)\tan\beta}{a+2l_s\tan\alpha}$$

where L is magnification of the beam shaping unit, x is direction of the light emitting point array, z is direction of an optical axis of the coherent light beam, y is direction perpendicular to the direction of the light emitting point array and to the direction of the optical axis, n is number of the light emitting points of the coherent light source, which is an integer equal to or larger than two, d is distance between the light emitting points, a is diameter of the coherent light beam emitted from the light emitting point on the yz-plane, b is diameter of the coherent light emitted from the light emitting point on xz-plane, α is half angle at half maximum of a divergence angle of the light emitting point on the yz-plane, β is half angle at half maximum of the divergence angle of the light emitting point on the xz-plane, $l_s$ is spatial propagation distance of light from a light emitting surface of the coherent light source to an incident end of the beam shaping unit, and $l_r$ is distance from the incident end of the beam shaping unit to the focusing optical system, light-intensity-distribution equalization effect of the beam shaping unit at least works such that full width at half maximum of an intensity distribution of a light beam emitted from each of the light emitting points after passing through the beam shaping unit is larger than full width at half maximum of an intensity distribution at the emitting ends of the light emitting points, reduction rate of the light in the focusing optical system satisfies $$T \leq \frac{c}{\sqrt{\{(a+2l_s\tan\alpha)L\}^2 + \{b+(n-1)\cdot d + 2(l_s+l_r)\tan\beta\}^2}}$$

where T is the reduction rate and c is fiber diameter of the optical fiber, and the optical fiber has such a length that each of the coherent light beams is reflected at least once therein.

9. The image display apparatus according to claim 7, wherein the beam shaping unit employs any one of a multi-lens acting in the yz-direction, a gradient-index microlens, and a holographic device.

10. The image display apparatus according to claim 7, wherein the beam shaping unit employs either one of a multi-lens in which a plurality of plano-convex cylindrical lenses are aligned to have a curvature in a y-direction and a multi-lens in which a plurality of plano-concave cylindrical lenses are aligned to have a curvature in the y-direction.

11. The image display apparatus according to claim 7, wherein the beam shaping unit is either one of a combination of a multi-lens in which a plurality of plano-convex cylindrical lenses are aligned to have a curvature in a y-direction and a plano-concave cylindrical lens and a combination of a multi-lens in which a plurality of plano-concave cylindrical lenses are aligned to have a curvature in the y-direction and a plano-concave cylindrical lens.

12. The image display apparatus according to claim 7, wherein the coherent light source includes a semiconductor laser or a surface emitting laser having a plurality of light emitting points that emit coherent light beams arranged in one-dimensional array and a solid state laser array.

* * * * *